(12) United States Patent
Dissett et al.

(10) Patent No.: US 6,688,194 B2
(45) Date of Patent: Feb. 10, 2004

(54) LOCKING DIFFERENTIAL INCLUDING IMPROVED CLUTCH MEMBER AND ADAPTER SLEEVE

(75) Inventors: Walter L. Dissett, Farmington Hills, MI (US); Paul J. Valente, Berkley, MI (US)

(73) Assignee: Tractech Inc., Warren, MI (US)

( * ) Notice: Subject to any disclaimer, the term of this patent is extended or adjusted under 35 U.S.C. 154(b) by 0 days.

(21) Appl. No.: 09/969,626

(22) Filed: Oct. 4, 2001

(65) Prior Publication Data

US 2003/0066386 A1 Apr. 10, 2003

(51) Int. Cl.[7] .............................................. F16H 48/12
(52) U.S. Cl. ...................................................... 74/650
(58) Field of Search ................ 74/650, 424; 192/70.28, 192/70.27; 475/248, 249

(56) References Cited

U.S. PATENT DOCUMENTS

| | | | |
|---|---|---|---|
| 2,555,044 A | 5/1951 | Lewis | |
| 4,498,355 A | * 2/1985 | Schou | 74/650 |
| 4,513,633 A | * 4/1985 | Goscenski, Jr. | 74/650 |
| 4,640,143 A | * 2/1987 | Schou | 74/650 |
| 4,949,594 A | * 8/1990 | Galhotra | 74/650 |
| 5,062,320 A | 11/1991 | Parsons et al. | |
| 5,413,015 A | 5/1995 | Zentmyer | |
| 5,461,941 A | 10/1995 | Young | |
| 5,542,316 A | 8/1996 | Spooner et al. | |
| 5,557,986 A | 9/1996 | Young et al. | |
| 5,560,268 A | 10/1996 | Young | |
| 5,590,572 A | 1/1997 | Valente | |
| 5,609,073 A | 3/1997 | Spooner et al. | |
| 5,715,733 A | 2/1998 | Dissett | |
| 5,727,430 A | 3/1998 | Valente | |
| 6,374,701 B1 | * 4/2002 | Tittjung | 74/650 |

* cited by examiner

Primary Examiner—Christopher P. Schwartz
Assistant Examiner—Melanie Torres
(74) Attorney, Agent, or Firm—Lawrence E. Laubscher, Sr.

(57) ABSTRACT

A locking differential includes a pair of annular coaxially-arranged axially-spaced clutch members having adjacent faces that contain cam groove that receive a driving cross pin, cooperating locking lugs and grooves being provided on the adjacent faces of the clutch members for preventing relative rotation therebetween. The cross pin extends diametrically across a supporting sleeve that is non-rotatably mounted concentrically within the central chamber of the cylindrical housing of the differential, thereby permitting the differential to be retrofit into various differential casings.

21 Claims, 6 Drawing Sheets

PRIOR ART

PRIOR ART

PRIOR ART

FIG. 18

LOCKING DIFFERENTIAL INCLUDING IMPROVED CLUTCH MEMBER AND ADAPTER SLEEVE

CROSS-REFERENCE TO RELATED APPLICATION

This application is related to the pending patent application Ser. No. 09/422,945 filed Oct. 22, 1999, in the name of Tittjung, which is assigned to the same assignee as the present invention.

BACKGROUND OF THE INVENTION

1. Field of the Invention

This invention relates to a locking differential that includes a pair of coaxially-arranged axially-spaced clutch members that are connected against rotation by cooperating locking lug and slot means contained on the adjacent faces of the clutch members. In a preferred embodiment, the adjacent faces of the clutch members also contain diametrically extending cam grooves that receive a driving cross pin the ends of which are supported by a tubular sleeve that is non-rotatably mounted concentrically within the cylindrical housing of the differential.

2. Brief Description of the Prior Art

Locking differentials for automotive vehicles are well known in the patented prior art, as evidenced by the patents to Lewis No. 2,555,044, Zentmyer No. 5,413,015, and Valente Nos. 5,590,572 and 5,727,430, and Dissett No. 5,715,733.

In these known differentials, it is common to utilize a pair of annular coaxially-arranged axially-spaced clutch members arranged on opposite sides of a diametrically extending driving cross pin that extends within mating cam grooves contained in the adjacent faces of the clutch members. Spring means normally bias the clutch members apart, and a locking pin extends axially from one face into a recess contained in the adjacent face of the other clutch member, thereby to prevent relative rotational movement between the clutch members. The locking pins are generally separate components, used in connection with a plurality of biasing springs and spacer disks or plugs, thereby causing assembly of the differential to be relatively labor intensive and manually difficult.

In the differential conversion market, it is common to retrofit one type of differential into the housing of another type of differential. For example, in certain automotive environments such as in high-performance all terrain four-wheel drive vehicles, it is desirable to substitute within a given casing a fully locking type differential for a limited slip differential. In one specific instance, it may be desired to retrofit within the differential housing of a limited slip differential mechanism of the fully locking type.

SUMMARY OF THE INVENTION

Accordingly, a primary object of the present invention is to provide a fully locking differential mechanism that is adapted to be retrofit within the housing of another type of differential, use being made of a mounting sleeve adapted for insertion and non-rotatable connection within the housing, which mounting sleeve carries the diametrically arranged cross pin the differential mechanism.

According to another object of the invention, the locking means of preventing relative rotation between the clutch members arranged on opposite sides of the cross pin comprises locking lugs that extend axially from one face of one clutch member into corresponding locking slots contained in the adjacent face of the other clutch member. In one embodiment, each clutch member contains a single locking lug and a single diametrically arranged locking slot operable to cooperate with a corresponding locking slot and locking lug on the adjacent face of the other clutch member. In a second embodiment, one clutch member carries two diametrically arranged locking lugs, and the other clutch member carries a corresponding pair of locking slots.

Owing to the use of the locking lugs and slots, the use of dowel-type locking pins and the associated machining of the holes therefore are eliminated, thereby reducing the number of parts and machining steps, whereby the overall cost of the clutch members is reduced. The resulting locking lug and slot design is more robust and durable, than the prior weak dowel pins, which often fail through use. Another advantage of the invention is that by the use of the locking lugs and slots; more space is provided for accommodating four biasing springs, rather than the two springs of the prior art. In the embodiment wherein each clutch member carries at least one locking lug and at least one locking slot, the further advantage is achieved that a pair of identical clutch members can serve as the clutch members of the differential, whereby the inventory of the types of clutch members required for production is reduced to one.

BRIEF DESCRIPTION OF THE DRAWINGS

Other objects and advantages of the invention will become apparent from a study of the following specification when viewed in the light of the accompanying drawings, in which.

DETAILED DESCRIPTION

Figure 1:
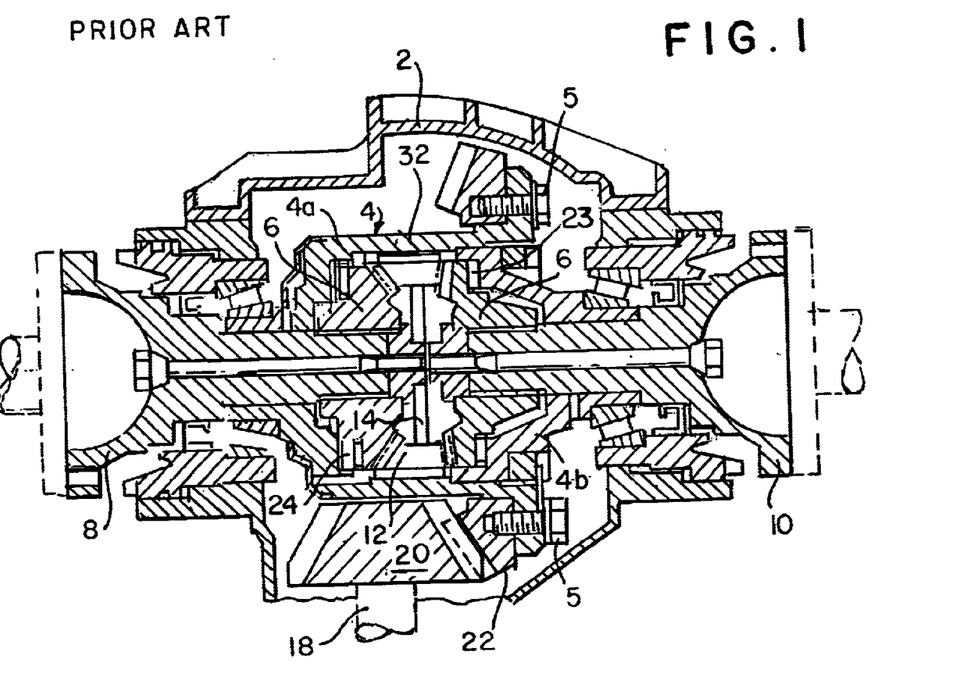
FIGS. 1 and 2 are longitudinal sectional and prospective views, respectively, of a limited slip differential of the prior art.
Figure 2:
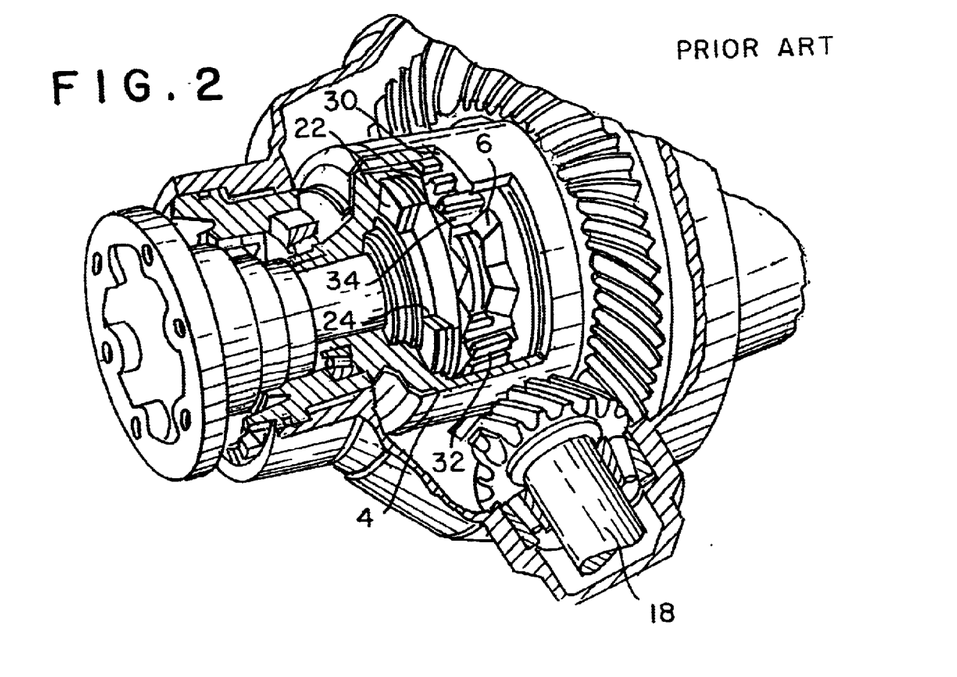

Referring first more particularly to FIGS. 1 and 2, it is known in the prior art, as shown, for example, by the illustrated A. P. SURETRAC differential produced by Automotive Products plc, to provide a limited slip differential having an outer casing 2 in which is rotatably mounted a housing 4 containing a central chamber for receiving a gearing arrangement including side gears 6 that are keyed with the left and right output shafts 8 and 10, respectively. The side gears 6 are connected by follower gears 12 that are rotatably mounted on a transverse shaft 14. The housing 4 is rotatably driven from drive shaft 18 via pinion gear 20 and a ring gear 22 that is bolted to the housing 4. The side gears are supported for rotation relative to the housing 4 by needle bearing means 23, and Belleville washer means 24.

As best shown in FIG. 2, the inner circumferential surface of the housing 4 provided with a plurality of longitudinally extending splines 30 that are engaged by corresponding splines 32 carried by the follower ring 34. In this limited slip differential, when one output shaft 8 or 10 overruns the other output shaft (such as might occur during the vehicle making a turn), the output shafts remain connected via the side gear 6 and the follower gear 12.

Figure 3:
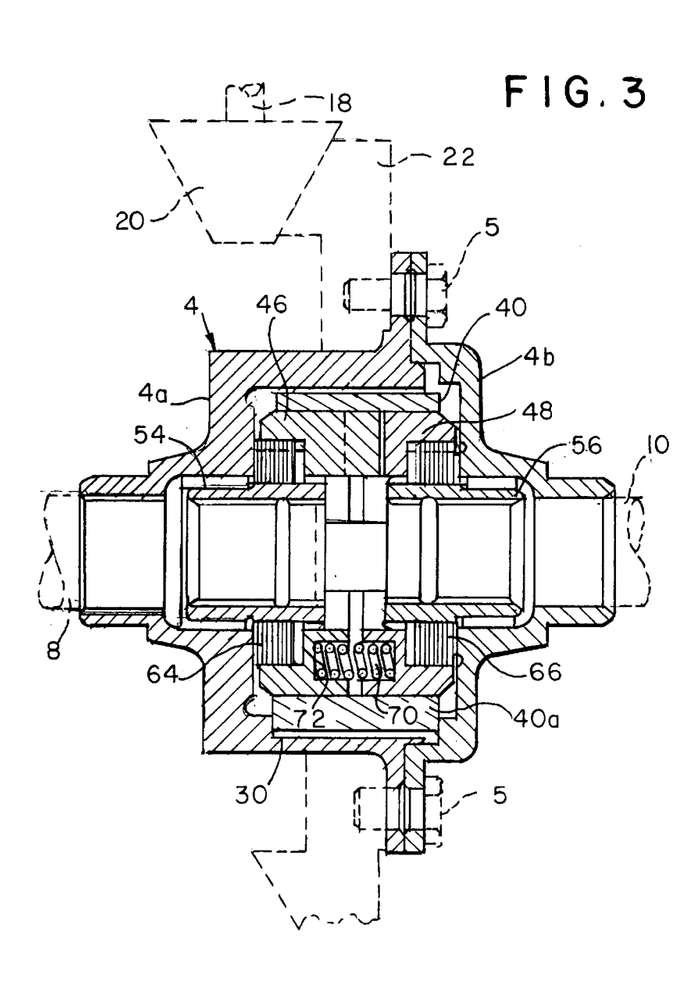
FIG. 3 is a longitudinal sectional view of the improved differential of the present invention.
Figure 4:
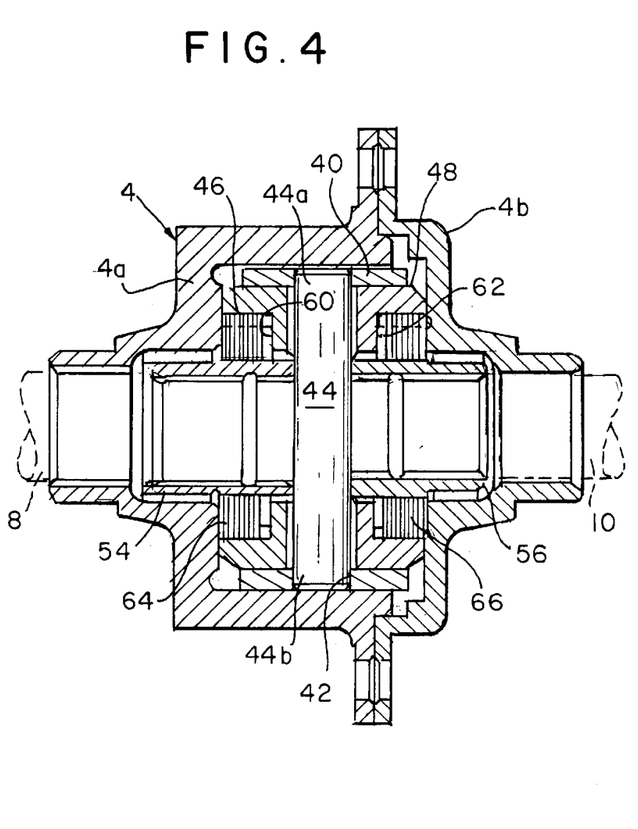
FIG. 4 is a similar sectional view displaced by 90° about the axis of the differential.
Figure 5:
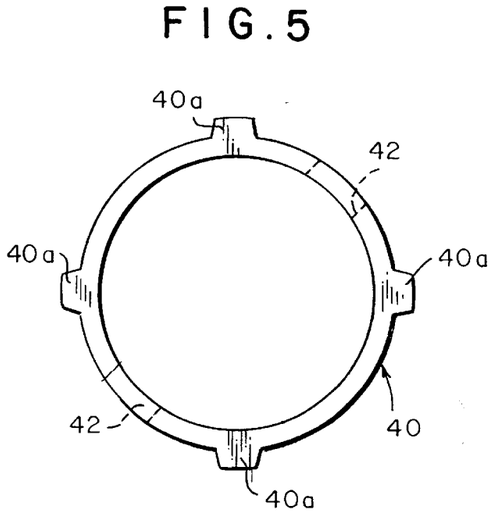
FIGS. 5 and 6 are end and side elevation views, respectively, of the sleeve member of the invention of FIGS. 3 and 4.
Figure 6:
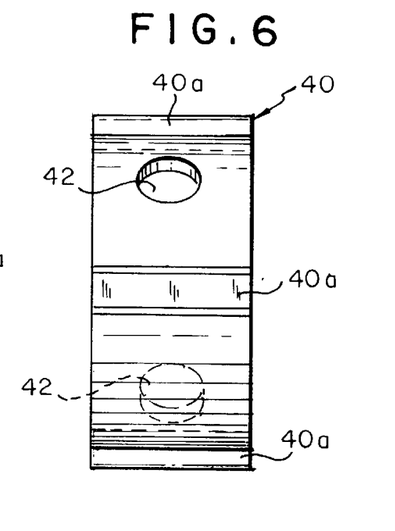

In accordance with the present invention, the limited slip differential mechanism of the apparatus of FIGS. 1 and 2 may be replaced by a fully locking differential mechanism as illustrated in FIGS. 3 and 4. To this end, use is made of a tubular mounting sleeve 40 having a plurality of circumferentially spaced longitudinally-extending splines 40a (FIGS. 5 and 6) that engage the internal circumferential splines 30 on the inner surface of the housing 4, thereby to prevent relative rotation between the sleeve 40 and the housing 4. The sleeve 40 contains a pair of diametrically arranged openings 42 that receive the end portions 44a and 44b of the cross pin 44, as shown in FIG. 4. Arranged on opposite sides of the cross pin 44 are a pair of coaxially-arranged axially-spaced annular clutch members 46 and 48. The adjacent faces of the clutch members 46 and 48 contain cam grooves 50 that are diametrically arranged for receiving the driving cross pin 44. The clutch members 46 and 48 are arranged in concentrically spaced relation about a pair of side gears 54 and 56 that are internally splined for non-rotational connection with the output shafts 8 and 10. The remote ends of the clutch members 46 and 48 contain counter bores 60 and 62 that receive friction clutch packs 64 and 66, respectively. As known in the art, the clutch packs 64 and 66 include annular friction disks that are arranged in a stack, a first set of alternate frictions disks being externally splined against rotation relative to the splined inner circumferential surface of the associated clutch member (FIG. 14), and the remaining alternate friction disks being internally splined for non-rotational connection with the associated side gear. Thus, as will be described in greater detail below, when either of the clutch members 46 or 48 is axially displaced outwardly relative to the drive cross pin 44, the associated friction pack 64 or 66 will be compressed, thereby to non-rotatably connect the clutch member with the associated side gear.

Figure 9:
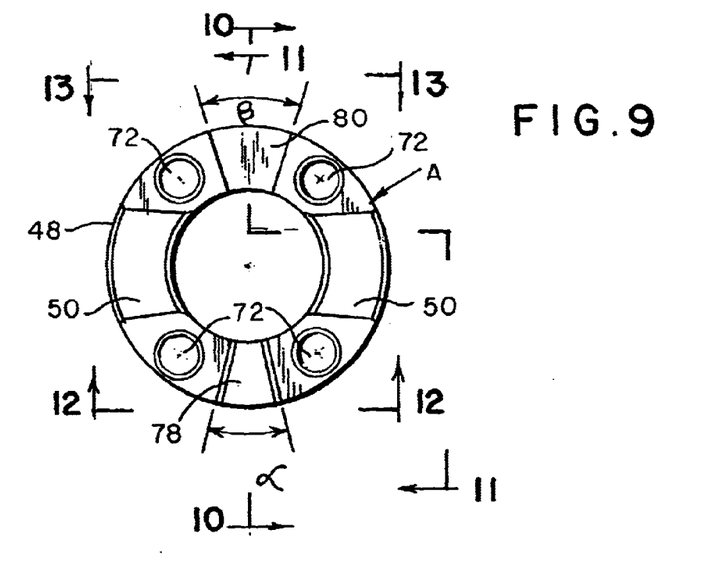
FIG. 9 is an end view of the clutch member of FIGS. 3, 4, and 8.
Figure 10:
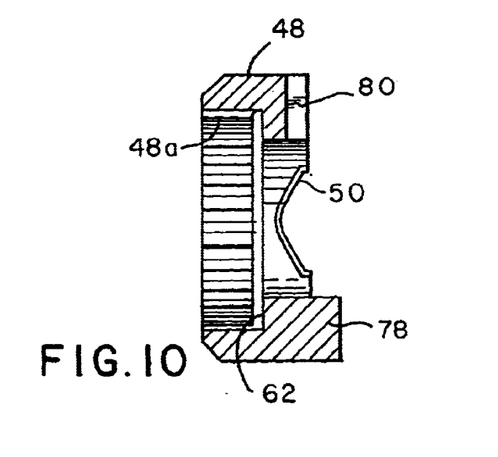
FIGS. 10–13 are sectional and side views taken along lines 10—10, 11—11, 12—12, and 13—13, respectively, of FIG. 9.
Figure 11:
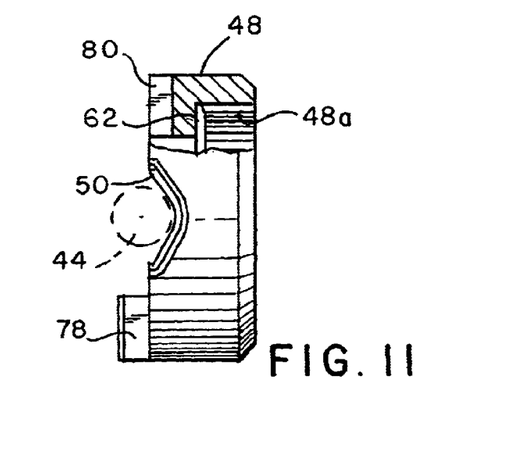
Figure 12:
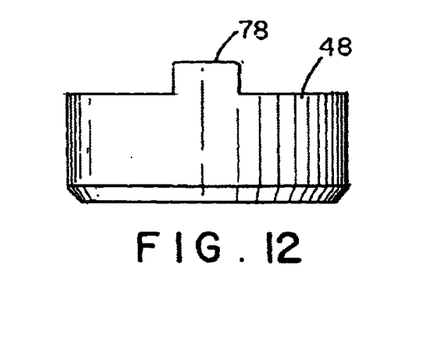
Figure 13:
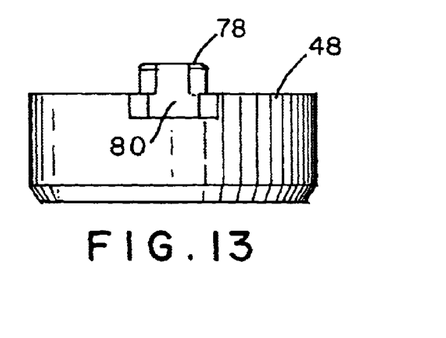

As is known in the art, the clutch members 46 and 48 and normally biased axially apart by a plurality of circumferentially arranged compression springs 70 (FIG. 3). As shown in FIG. 9, each face of the clutch member contains four bores 72 for receiving the ends of four compression springs 70, respectively.

In accordance with a characterizing feature of the invention, rotation of the clutch members 46 and 48 relative to each other is prevented by the cooperation between locking lugs 78 that extend axially from one face of the clutch member into a corresponding locking slot or groove 80 contained in the opposing adjacent face of the other clutch member. As shown in FIG. 9, the radian angle $\alpha$ subtended by the locking lug 78 is less than the radian angle $\beta$ defined by the locking slot 80. Thus, a slight angular adjustment between the clutch members is permitted, as will be described below. In the illustrated embodiment, the angle $\alpha$ is 26.5°, and the angle $\beta$ is 35°, thereby providing an angle of adjustment of 8.5°.

Figures 14, 15, 16:
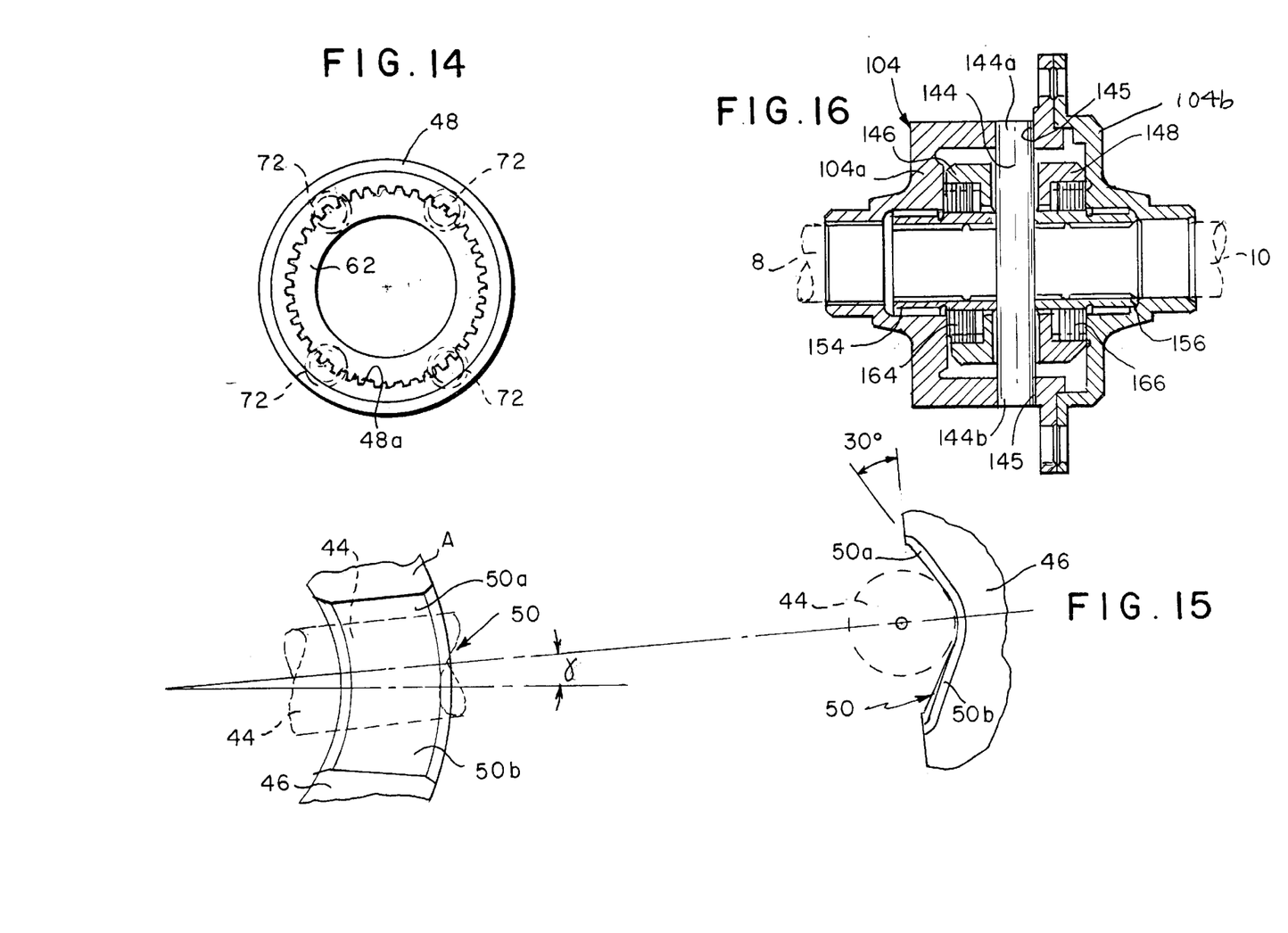
FIG. 14 is a right-hand end view of the clutch member of FIG. 11.
FIG. 15 is a diagrammatic enlarged view of the clutch portion A of the FIG. 9.
FIG. 16 is a longitudinal sectional view of a second embodiment of the invention wherein the mounting sleeve of FIGS. 3 and 4 has been eliminated.

In accordance with an important feature of the invention, the cam grooves 50 have a generally V-shaped configuration and include side walls 50a and 50b that are generally planar but are skewed by the angle $\gamma$, as shown in FIG. 15. FIG. 15 is an enlarged diagrammatic view of the portion A of FIG. 9. As shown in FIG. 15, the wall surfaces 50a and 50b are inclined at an angle of 30° relative to the face of the associated clutch member 46, and the skew angle $\gamma$ is 4.25° relative to the center line of the cross pin.

Operation

In operation, assume that the limited slip differential of FIGS. 1 and 2 has been disassembled and the housing sections 4a and 4b are disconnected by unbolting the fastening bolts 5. The differential mechanism is axially removed from the housing section 4a by axially sliding the follower carrier 34 relative to the housing 4, thereby removing the cross shaft 14, pinions 12, side gear 6, and associated bearings from the chamber contained in housing 4. The fully locking differential of FIGS. 3 and 4 is then inserted within the chamber contained in housing section 4a, whereupon the housing sections 4a and 4b are again bolted together by the bolts 5, and the driven output shafts 8 and 10 are inserted axially within the housing 4 into splined non-rotatable connection with the side gears 54 and 56, respectively.

Owing to the fact that the angle $\beta$ of the groove 80 is larger than the $\alpha$ of the locking lug 78, there is a limited amount of angular play between the two clutch members 46 and 48. Furthermore, owing to the skew angle $\gamma$ between the wall surfaces 50a and 50b of the cam groove 50, that is, when the full differential assembly is in a neutral position so that the cross pin does not make contact with either of the side walls 50a and 50b of the cam groove 50, there is a specific amount of clearance and play in the unit. The cross pin rotates around and touches the V-slot surfaces of the cam groove, and starts to run up the ramps of the V-slots. This forces the clutch members 46 and 48 to separate axially outwardly, and eliminates the aforementioned end play. Once the end play is eliminated, the two clutch packs lock up, thereby permitting torque to flow to both axles. The point where the end play is eliminated can be measured by the angle $\gamma$ (in this case, at an skewing angle of 4.25°).

The condition described above simulates a vehicle being driven in a straight ahead mode or a straight reverse mode. When the vehicle begins to make a turn in either direction, the outside faster running wheel and the clutch member associated therewith pulls forward of the ramps 50a or 50b, thereby allowing the end play to return on that side, deactivating the associated clutch pack to the non-compressed condition, thereby allowing the outside wheel to be driven at ground speed. This mode is operable for left- and right-hand turns, and for forward and reverse operation.

Figures 7, 8:
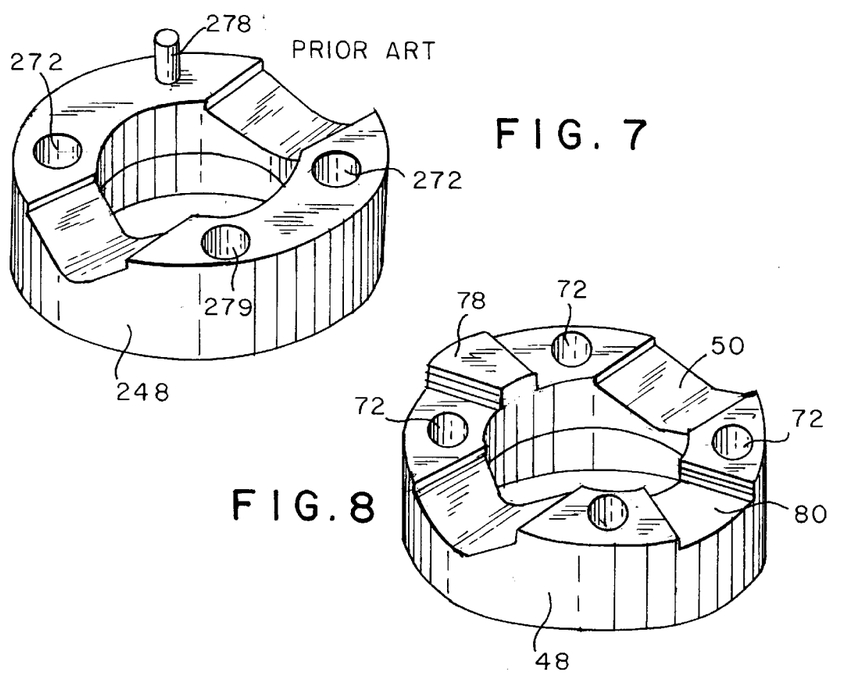
FIGS. 7 and 8 are perspective views illustrating the clutch member of the prior art and a first embodiment of the clutch member of the present invention, respectively.

Referring now to FIG. 7, it will be seen that in the prior art clutch member 48, a single dowel locking pin 278 projects from one face of the clutch member, which face contains a diametrically arranged bore 279 for receiving the dowel pin of the associated clutch member. A pair of diametrically arranged bores 272 are provided for receiving two biasing compression springs. As shown in FIG. 8, the clutch member 48 of the present invention, on the other hand, contains four bores 72 for receiving four biasing compression springs, thereby to allow a more even axial relative displacement of the clutch members.

According to the modified embodiment of the invention shown in FIG. 16, the mounting sleeve 40 of the embodiment of FIGS. 3 and 4 is omitted, and the cross pin 144 has end portions 144a and 144b extend within through bores 145 contained in the housing 104. Otherwise, the operation of the second embodiment of the differential is identical so that of the embodiment of FIGS. 3 and 4.

Figure 17:
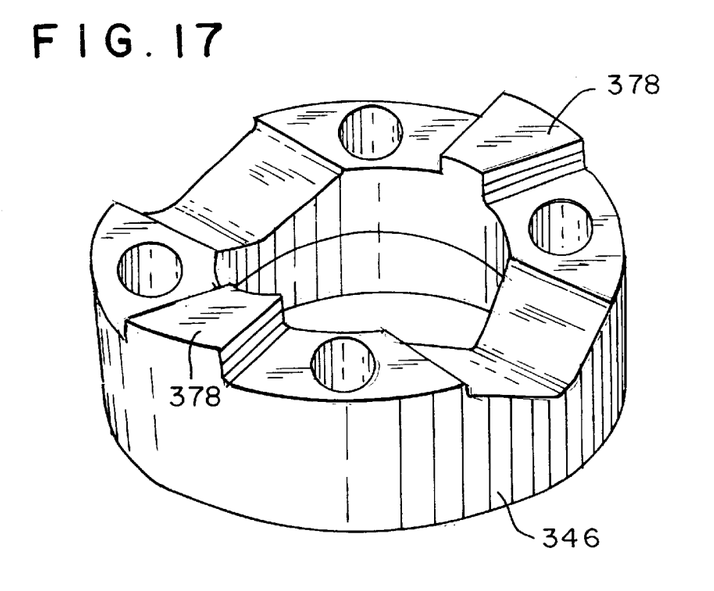
FIGS. 17 and 18 are perspective views of a further embodiment of a pair of clutch members of the present invention.
Figure 18:
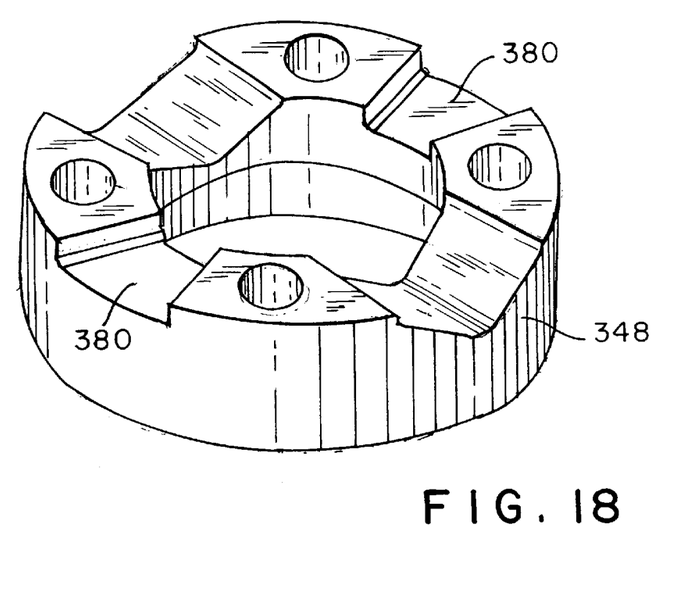

Referring now to FIGS. 17 and 18, according to another modification of the invention, the clutch member 346 is provided with two diametrically opposed locking lugs 378, and the opposing face of the second clutch member 348 contains a pair of corresponding locking grooves or slots 380. This embodiment is easier to produce from a manufacturing standpoint, has less material waste, and thus is cheaper to produce.

While specific examples of the radian angles of the locking slots and locking lugs have been set forth, it is apparent that a certain degree of variation of these angles is permitted. Similarly, the skew angle of the side walls of the V-shaped drive groove may be varied as desired.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. In a locking differential mechanism for an automotive vehicle including a drive shaft; a pair of coaxially-arranged axially-spaced driven shafts; a cylindrical housing containing central chamber, said housing including a pair of end wall portions containing first end openings rotatably receiving said driven shafts, respectively; a hollow cylindrical casing containing a central chamber arranged concentrically about said housing, and a pair of end wall portions containing second end openings rotatably receiving said housing end portions, respectively; and drive pinion means driven by said drive shaft for rotatably driving said housing relative to said casing; the improvement which comprises:

(a) a tubular sleeve arranged concentrically within said housing chamber;
    (b) connecting means connecting said sleeve against rotation relative to said housing;
    (c) a cross pin extending diametrically across said sleeve, said cross-pin having a pair of end portions that extend within corresponding openings contained in said sleeve, respectively;
    (d) a pair of tubular coaxially-arranged axially-spaced side gears rotatably mounted in said housing end openings on opposite sides of said cross-pin, respectively, said side gears being internally splined for non-rotatable connection with the adjacent ends of said output shafts, respectively;
    (e) a pair of coaxially-arranged axially-spaced annular clutch members arranged concentrically about said side gears on opposite sides of said cross-pin, respectively, the remote ends of said clutch members containing counterbores, respectively, the adjacent faces of said clutch members containing diametrically arranged cam grooves receiving said cross-pin;
    (f) a pair of annular friction pack means arranged within said clutch member counterbores concentrically about said side gears, respectively, each of said friction pack means including a plurality of annular friction disks alternate first ones of which are internally splined for non-rotatable axial displacement relative to the associated side gear, alternate second ones of said friction disks being externally splined for non-rotatable axial displacement relative to the associated clutch member, each of said friction pack means being operable between a non-compressed condition in which successive friction disks are freely rotatable relative to each other, and an axially compressed condition in which said friction pack means is axially compressed between the bottom wall of said counterbore and the associated housing chamber end wall, wherein the successive friction disks of said friction pack means are in face-to-face non-rotatable contact, thereby to non-rotatably connect the clutch member and the side gear associated with said compressed friction pack means;
    (g) spring means normally biasing said clutch members apart relative to said cross-pin, thereby to cause each of said friction pack means to be in a normally compressed condition; and
    (h) locking means connecting said clutch members against rotation relative to each other;
    (i) said clutch member cam grooves having such a configuration that when one of the output shafts overruns the other by a given amount, the associated overrunning side gear and clutch member are angularly displaced relative to said cross-pin, thereby to cause the associated overrunning friction pack means to be in its non-compressed condition, whereby the overrunning shaft is placed in a free-wheeling disconnected condition relative to the differential mechanism.

2. A locking differential as defined in claim 1, wherein said connecting means preventing rotation between said housing and said sleeve include cooperating longitudinal splines arranged in the external circumferential surface of said sleeve and the internal circumferential surface of said housing.

3. A locking differential mechanism as defined in claim 1, wherein said locking means includes at least one locking lug arranged on the face of one clutch member adjacent the other clutch member, said locking lug extending within a corresponding radial locking slot contained in the adjacent face of the other clutch member.

4. A locking differential mechanism as defined in claim 3, wherein each face of each clutch member includes a first locking lug, and a first radial locking slot diametrically arranged relative to said first lug.

5. A locking differential as defined in claim 3, wherein the face of one of said clutch members includes a pair of diametrically arranged locking lugs, and the adjacent face of the other of said clutch members includes a pair of diametrically arranged corresponding radial locking slots, for receiving said locking lugs, respectively.

6. A locking differential mechanism as defined in claim 3, wherein the width of said locking slot is slightly greater than the corresponding width of said locking lug, thereby to permit limited angular displacement between said clutch members.

7. A locking differential mechanism as defined in claim 6, wherein said locking lug subtends a radian angle of about 26.5°, and said locking slot subtends a radian angle of about 35°.

8. A locking differential mechanism as defined in claim 1, wherein said cam grooves have a generally V-shaped cross-sectional configuration.

9. A locking differential mechanism as defined in claim 8, wherein the side walls of each of said cam grooves are skewed relative to the radius containing the apex of said cam groove.

10. A locking differential as defined in claim 9, wherein said cam groove side walls are skewed from about 2.5° to about 4.5° relative to the radial axis extending through the apex of said cam groove.

11. In a locking differential mechanism for an automotive vehicle including a drive shaft; a pair of coaxially-arranged axially-spaced driven shafts; a cylindrical housing containing central chamber, said housing including a pair of end wall portions containing first end openings rotatably receiving said driven shafts, respectively; a hollow cylindrical casing containing a central chamber arranged concentrically about said housing, and a pair of end wall portions containing second end openings rotatably receiving said housing end portions, respectively; and drive pinion means driven by said drive shaft for rotatably driving said housing relative to said casing; the improvement which comprises:

(a) a cross pin (144) extending diametrically across said housing central chamber, said cross pin having a pair of end portions that are non-rotatably connected with said housing;

(b) a pair of tubular coaxially-arranged axially-spaced side gears (154, 156) rotatably mounted in said housing end openings on opposite sides of said cross-pin, respectively, said side gears being internally splined for non-rotatable connection with the adjacent ends of said output shafts, respectively;

(c) a pair of coaxially-arranged axially-spaced annular clutch members (146, 148) arranged concentrically about said side gears on opposite sides of said cross-pin, respectively, the remote ends of said clutch members containing counterbores, respectively, the adjacent faces of said clutch members containing diametrically arranged cam grooves receiving said cross-pin;

(d) a pair of annular friction pack means (164, 166) arranged within said clutch member counterbores concentrically about said side gears, respectively, each of said friction pack means being operable between axially compressed and non-compressed conditions for connecting and disconnecting the associated side gear and clutch members, respectively.

(e) spring means normally biasing said clutch members apart relative to said cross-pin, thereby to cause each of said friction pack means to be in said compressed condition; and (f) locking means connecting said clutch members for limited angular displacement relative to each other, said locking means including:

(1) at least one radially-extending integral locking lug (78, 378) arranged solely on the face of one clutch member adjacent the other clutch member;

(2) the face of said other clutch member adjacent said one clutch member containing a radial slot (80, 380) for receiving said locking lug;

(3) said radial slot having a larger width than the corresponding width of said locking lug, thereby to permit limited angular relative displacement of said clutch members;

(g) said clutch member cam grooves having such a configuration that when one of the output shafts overruns the other by a given amount, the associated overrunning side gear and clutch member are angularly displaced relative to said cross-pin, thereby to cause the associated overrunning friction pack means to be in its non-compressed condition, whereby the overrunning shaft is placed in a free-wheeling disconnected condition relative to the differential mechanism.

12. A locking differential mechanism as defined in claim 11, wherein said clutch members have adjacent faces each including a first radially-extending locking lug (78), and a first radial locking slot (80) diametrically arranged relative to said first locking lug.

13. A locking differential as defined in claim 11, wherein the face of one of said clutch members includes a pair of diametrically arranged radially-extending locking lugs (378), and the adjacent face of the other of said clutch members includes a pair of diametrically arranged corresponding radial locking slots; (380) for receiving said locking lugs, respectively.

14. A locking differential as defined in claim 11, wherein the angle of limited relative displacement of said clutch members is about 8°.

15. A locking differential as defined in claim 11, wherein said cam grooves have a generally V-shaped configuration, the side walls of each of said cam grooves being skewed relative to the radius containing the apex of said cam groove.

16. A locking differential as defined in claim 11, wherein said spring means includes a plurality of springs arranged between the adjacent faces of said clutch members in a circular concentric pattern relative to the axis of said clutch members.

17. A locking differential as defined in claim 11, wherein said clutch members have adjacent faces containing at least two opposed bores; and further wherein said spring means includes a plurality of compression springs having end portions mounted in said opposed bores, respectively.

18. A locking differential as defined in claim 17, wherein said clutch member adjacent faces each include at least four bores arranged in circumferentially spaced relation about the axis of the associated clutch member, the bores contained in said faces being arranged in an opposed relation, respectively, said spring means including a plurality of compression springs having end portions mounted in said opposed bores, respectively.

19. In a locking differential mechanism for an automotive vehicle including a drive shaft; a pair of coaxially-arranged axially-spaced driven shafts; a cylindrical housing containing central chamber, said housing including a pair of end wall portions containing first end openings rotatably receiving said driven shafts, respectively; a hollow cylindrical casing containing a central chamber arranged concentrically about said housing, and a pair of end wall portions containing second end openings rotatably receiving said housing end portions, respectively; and drive pinion means driven by said drive shaft for rotatably driving said housing relative to said casing; the improvement which comprises:

(a) a cross pin extending diametrically across said housing central chamber, said cross pin having a pair of end portions that are non-rotatably connected with said housing;

(b) a pair of tubular coaxially-arranged axially-spaced side gears rotatably mounted in said housing end openings on opposite sides of said cross-pin, respectively, said side gears being internally splined for non-rotatable connection with the adjacent ends of said output shafts, respectively;

(c) a pair of coaxially-arranged axially-spaced annular clutch members arranged concentrically about said side gears on opposite sides of said cross-pin, respectively, the remote ends of said clutch members containing counterbores, respectively, the adjacent faces of said clutch members containing diametrically arranged cam grooves receiving said cross-pin, said cam grooves having a generally V-shaped cross-sectional configuration, the side walls of each of said cam grooves being skewed relative to the radius containing the apex of said cam groove;

(d) a pair of annular friction pack means arranged within said clutch member counterbores concentrically about said side gears, respectively, each of said friction pack means including a plurality of annular friction disks alternate first ones of which are internally splined for non-rotatable axial displacement relative to the associated side gear, alternate second ones of said friction disks being externally splined for non-rotatable axial displacement relative to the associated clutch member, each of said friction pack means being operable between a non-compressed condition in which successive friction disks are freely rotatable relative to each other, and an axially compressed condition in which said friction pack means is axially compressed between the bottom wall of said counterbore and the associated housing chamber end wall, wherein the successive friction disks of said friction pack means are in face-to-face non-rotatable contact, thereby to non-rotatably connect the clutch member and the side gear associated with said compressed friction pack means;

(e) spring means normally biasing said clutch members apart relative to said cross-pin, thereby to cause each of said friction pack means to be in said compressed condition; and (f) locking means connecting said clutch members against rotation relative to each other;

(g) said clutch member cam grooves having such a configuration that when one of the output shafts overruns the other by a given amount, the associated overrunning side gear and clutch member are angularly displaced relative to said cross-pin, thereby to cause the associated overrunning friction pack means to be in its non-compressed condition, whereby the overrunning shaft is placed in a free-wheeling disconnected condition relative to the differential mechanism;

(h) said locking means including at least one locking lug arranged on the face of one clutch member adjacent the other clutch member, said locking lug extending within a corresponding radial locking slot contained in the adjacent face of the other clutch member.

20. A locking differential as defined in claim 19, wherein said cam groove side walls are skewed from about 2.5° to about 4.5° relative to the radial axis extending through the apex of said cam groove.

21. In a locking differential mechanism for an automotive vehicle including a drive shaft; a pair of coaxially-arranged axially-spaced driven shafts; a cylindrical housing containing central chamber, said housing including a pair of end wall portions containing first end openings rotatably receiving said driven shafts, respectively; a hollow cylindrical casing containing a central chamber arranged concentrically about said housing, and a pair of end wall portions containing second end openings rotatably receiving said housing end portions, respectively; and drive pinion means driven by said drive shaft for rotatably driving said housing relative to said casing; the improvement which comprises:

(a) a cross pin extending diametrically across said housing central chamber, said cross pin having a pair of end portions that are non-rotatably connected with said housing;

(b) a pair of tubular coaxially-arranged axially-spaced side gears rotatably mounted in said housing end openings on opposite sides of said cross-pin, respectively, said side gears being internally splined for non-rotatable connection with the adjacent ends of said output shafts, respectively;

(c) a pair of coaxially-arranged axially-spaced annular clutch members arranged concentrically about said side gears on opposite sides of said cross-pin, respectively, the remote ends of said clutch members containing counterbores, respectively, the adjacent faces of said clutch members containing diametrically arranged cam grooves receiving said cross-pin;

(d) a pair of annular friction pack means arranged within said clutch member counterbores concentrically about said side gears, respectively, each of said friction pack means including a plurality of annular friction disks alternate first ones of which are internally splined for non-rotatable axial displacement relative to the associated side gear, alternate second ones of said friction disks being externally splined for non-rotatable axial displacement relative to the associated clutch member, each of said friction pack means being operable between a non-compressed condition in which successive friction disks are freely rotatable relative to each other, and an axially compressed condition in which said friction pack means is axially compressed between the bottom wall of said counterbore and the associated housing chamber end wall, wherein the successive friction disks of said friction pack means are in face-to-face non-rotatable contact, thereby to non-rotatably connect the clutch member and the side gear associated with said compressed friction pack means;

(e) spring means normally biasing said clutch members apart relative to said cross-pin, thereby to cause each of said friction pack means to be in said compressed condition; and (f) locking means connecting said clutch members against rotation relative to each other;

(g) said clutch member cam grooves having such a configuration that when one of the output shafts overruns the other by a given amount, the associated overrunning side gear and clutch member are angularly displaced relative to said cross-pin, thereby to cause the associated overrunning friction pack means to be in its non-compressed condition, whereby the overrunning shaft is placed in a free-wheeling disconnected condition relative to the differential mechanism;

(h) said locking means including at least one integral locking lug arranged on the face of one clutch member adjacent the other clutch member, said locking lug extending within a corresponding radial locking slot contained in the adjacent face of the other clutch member, said locking lug having a radian angle of about 26.5° and said slot having a radian angle of about 35°.

* * * * *